(12) United States Patent
Bessettes et al.

(10) Patent No.: US 9,783,311 B2
(45) Date of Patent: Oct. 10, 2017

(54) METHOD FOR ARMING/DISARMING AN AIRCRAFT DOOR EVACUATION SLIDE AND IMPLEMENTATION MECHANISM

(71) Applicant: LATECOERE, Toulouse (FR)

(72) Inventors: Cyrille Bessettes, Buzet sur Tarn (FR); Damien Buchet, Toulouse (FR); Renaud Othomene, Toulouse (FR)

(73) Assignee: Latecoere, Toulouse (FR)

( * ) Notice: Subject to any disclaimer, the term of this patent is extended or adjusted under 35 U.S.C. 154(b) by 115 days.

(21) Appl. No.: 14/897,330

(22) PCT Filed: Jun. 13, 2014

(86) PCT No.: PCT/EP2014/062482
§ 371 (c)(1),
(2) Date: Dec. 10, 2015

(87) PCT Pub. No.: WO2014/198952
PCT Pub. Date: Dec. 18, 2014

(65) Prior Publication Data
US 2016/0107755 A1   Apr. 21, 2016

(30) Foreign Application Priority Data
Jun. 14, 2013   (FR) ..................................... 13 55563

(51) Int. Cl.
*B64C 1/00* (2006.01)
*B64D 25/14* (2006.01)
*B64C 1/14* (2006.01)

(52) U.S. Cl.
CPC ............ *B64D 25/14* (2013.01); *B64C 1/1407* (2013.01)

(58) Field of Classification Search
None
See application file for complete search history.

(56) References Cited

U.S. PATENT DOCUMENTS 3,463,266 A * 8/1969 Day ...................... B64D 25/14
 182/48
3,633,853 A * 1/1972 Collins .................. B64D 25/14
 182/48

(Continued)

FOREIGN PATENT DOCUMENTS

EP 0743246 11/1996
WO WO8400786 3/1984

*Primary Examiner* — Medhat Badawi
(74) *Attorney, Agent, or Firm* — Defillo & Associates, Inc.; Evelyn A Defillo (57) ABSTRACT

The objective of the invention is to replace the rope bar of the door evacuation slide with individual connections. According to a preferred embodiment, the mechanism for arming/disarming an aircraft door evacuation slide (1, 15, 16) includes two releasable connectors (21) disposed to either side of the base of the door and each includes two half connectors (21s, 21i), a so-called upper half connector (21s, 41, 4a, 42) rigidly connected to the door (1) and having an attachment device (33) for attachment to the slide, and a so-called lower half connector (21i) fixed to the cabin floor (6). Each upper half connector (21s) includes a movable inner part controlled by a ring (43) and housed in the corresponding lower half-connector (21i). The mechanism can also include an electric motor coupled to two rods (31), each rod (31) being capable of rotating the control ring (43) of each upper half connector (21s) between two angular positions: an armed position and a disarmed position.

18 Claims, 6 Drawing Sheets

(56) References Cited

U.S. PATENT DOCUMENTS

| | | | | |
|---|---|---|---|---|
| 3,634,914 A * | 1/1972 | Schroedter | B64D 25/14 | 16/325 |
| 3,744,816 A * | 7/1973 | Yamaguchi | B60R 21/268 | 137/68.13 |
| 4,106,729 A * | 8/1978 | Bergman | B64D 25/14 | 193/25 B |
| 4,125,235 A * | 11/1978 | Fitzgerald | B64C 1/143 | 244/129.5 |
| 4,375,877 A * | 3/1983 | Shorey | B64D 25/14 | 182/48 |
| 4,470,566 A * | 9/1984 | Fitzgerald | B64C 1/1407 | 244/129.1 |
| 4,512,539 A * | 4/1985 | Ackermann | B64C 1/1407 | 244/137.2 |
| 4,715,562 A * | 12/1987 | Bokalot | B64C 1/1407 | 244/137.2 |
| 4,720,065 A * | 1/1988 | Hamatani | B64C 1/1407 | 244/129.5 |
| 4,726,146 A * | 2/1988 | Opsahl | B64C 1/1407 | 16/332 |
| 5,106,036 A * | 4/1992 | Sepstrup | B64D 25/14 | 244/129.1 |
| 5,156,359 A * | 10/1992 | Noble | B64C 1/1407 | 244/129.4 |
| 5,400,985 A * | 3/1995 | Banks | B64D 25/14 | 182/48 |
| 5,738,303 A * | 4/1998 | Hamatani | B64D 25/14 | 244/129.1 |
| 6,443,259 B1 * | 9/2002 | Oney | B64D 25/14 | 182/18 |
| 6,457,677 B2 * | 10/2002 | Dazet | B64D 25/14 | 244/137.1 |
| 7,090,168 B1 * | 8/2006 | Brown | B64D 25/14 | 182/48 |
| 9,302,760 B2 * | 4/2016 | Kharitonov | B60J 5/00 | |
| 9,327,820 B2 * | 5/2016 | Lamat | B64C 1/1407 | |
| 2002/0162916 A1 * | 11/2002 | Baderspach | B64D 25/14 | 244/137.2 |
| 2008/0099605 A1 * | 5/2008 | Yada | B64C 1/143 | 244/118.3 |
| 2009/0020648 A1 * | 1/2009 | Bullesbach | B64D 25/14 | 244/137.2 |
| 2010/0019089 A1 * | 1/2010 | Sibley | B64C 1/1407 | 244/129.5 |
| 2010/0294888 A1 * | 11/2010 | Texcier | B64C 1/1407 | 244/129.5 |
| 2013/0075524 A1 * | 3/2013 | Islam | B64D 25/00 | 244/118.5 |
| 2015/0014483 A1 * | 1/2015 | Minchau | B64C 1/143 | 244/129.5 |
| 2015/0292254 A1 * | 10/2015 | Bessettes | B64C 1/1407 | 49/31 |
| 2016/0083071 A1 * | 3/2016 | Pichlmaier | B64C 1/1423 | 92/76 |

* cited by examiner

Figure 6c

METHOD FOR ARMING/DISARMING AN AIRCRAFT DOOR EVACUATION SLIDE AND IMPLEMENTATION MECHANISM

CROSS REFERENCE TO RELATED APPLICATION

This application is a national stage entry of PCT/EP2014/062482 filed Jun. 13, 2014, under the International Convention claiming priority over French Patent Application No. 1355563 Jun. 14, 2013.

TECHNICAL FIELD

The invention relates to a method for arming/disarming an aircraft door evacuation slide connected to the cabin floor of the aircraft and a mechanism for implementing such a method.

In airliners, the doors are generally equipped with an inflatable evacuation slide for the emergency exit of the passengers, for example in the event of an emergency landing. This is because the cabin floor of these aircraft is too high to enable the passengers and the crew to jump out without risking serious injury.

The deployment of an evacuation slide proceeds in three steps:

commanding arming of the evacuation slide on the door, which attaches a girt bar at the upper end of the evacuation slide to fittings integrated into the floor of the cabin;

emergency opening of the door by actuation of the interior handle of the door, which triggers its automatic opening and releases the uninflated evacuation slide, which falls out of the cabin; and inflation of the evacuation slide triggered by Venturi effect thanks to the nitrogen pressure supplied by a tank provided for this purpose: the evacuation slide is deployed, its bottom part comes into contact with the ground outside the aircraft and the occupants then make use of the evacuation slide to exit the aircraft safely.

A control is used to arm or disarm the evacuation slide and a visual indicator informs the operator of the arming status of each evacuation slide at all times. The operator therefore actuates the control before takeoff to verify that the status of the door changes correctly from the "disarmed" status (DISARM) in which the evacuation slide cannot be released to the "armed" status (ARM) enabling the evacuation slide to be released if necessary.

BACKGROUND OF THE INVENTION

The ARM/DISARM commands correspond to two positions of a dedicated handle that also visually indicate the status of the door. An indicator lamp can confirm this status at all times.

In the disarmed position, the evacuation slide is stored in a box fixed to the internal wall of the door in the form of a tube attached to and surrounding the girt bar, the box being arranged at the bottom of the door or in some installations in the fuselage, under the door threshold. The girt bar is held parallel to the floor of the cabin by U-shaped clamps provided with releasable clips in the form of leaf springs or the like. When the handle is moved to the door armed position (ARM), the rotation movement of the handle is converted into vertical translation movement by mechanical cables—for example "push-pull" cables—to lock handles attached to the bar to jaws of integrated fittings under the threshold of the floor. Conversely, of the bar is released by a mechanism for relaxing the jaws actuated by a cable connected to an ancillary handle, for example. A visual indicator reinforced by an audible warning device advises the operator that the evacuation slide of the door that they are attempting to open is armed.

This type of solution has been described in numerous patent documents, such as U.S. Pat. Nos. 3,634,914, 4,715,562, EP 0743 246 or WO 8400786, for example.

Improvements have been proposed in order to take into account particular issues in the perilous context of emergency opening of a cabin door. For example, to prevent the untimely deployment of the evacuation slide, US patent document 2011/0139934 provides human presence sensors facing the cabin door connected to a warning device indicating such presence in the vicinity of the internal handle of the door.

Another example, referred to in the document U.S. Pat. No. 7,090,168, concerns the load supported by the girt bar attached at its ends when the evacuation slide is deployed and inflated. In order to prevent the generation of a bending moment at the centre of the bar, which might cause it to break, superposed flexible panels are provided to create a distribution of the forces from connection points on the girt bar or on the cabin floor fittings.

However, the girt bar and the locking cables of such a bar have numerous disadvantages:

the bar has a non-negligible weight and forms an obstacle to be overcome before jumping onto the evacuation slide;

anchoring the fittings under the threshold of the floor leads to accumulation of dust and other "detritus" (soil, small objects, etc.), which fouls the mechanics and can prevent correct deployment of the evacuation slide;

the transmission cables may jam or break because of the complexity of the system;

disarming can be difficult under difficult climatic conditions: frost, ice, snow, corrosion, jamming, etc.;

if it is not equipped with a "snap-action" type tensioning device, the ARM/DISARM handle can assume an intermediate position between the two command positions;

it is difficult to demount an evacuation slide in order to remount it at another door in the event of ditching.

SUMMARY OF THE INVENTION

The invention aims to circumvent these disadvantages by decoupling the command and information aspect from the activation aspect and by eliminating the girt bar, which is replaced by a connection of the evacuation slide to attachment points. These attachment points are then moved by electrical means to grip fixed fittings in a reversible manner and with no anchoring. The mechanism driving the anchor points is then totally on the door side, well protected from environmental aggression.

In this regard, the present invention consists in a method for arming/disarming an aircraft door evacuation slide connected to a cabin floor of the aircraft, this method consisting—in a so-called arming mode (ARM)—in lowering the door into a closed position to engage parts forming at least two releasable connections, the parts of each connection being rigidly connected to the door and to the cabin floor, respectively, locking the connections by a locking driving motion triggered by an energy source, in the event of an emergency evacuation, unfurling and inflating the evacuation slide attached only to each connection, and—in a so-called disarming mode (DISARM)—unlocking said connections by a reverse mechanical driving motion and then raising the door to decouple the connections before opening it. The energy source is preferably electrical, but it may alternatively be mechanical with manual actuation relayed by appropriate cables.

In accordance with particular embodiments:

the connecting parts rigidly connected to the cabin floor form extensions emerging from the floor;

the connecting parts rigidly connected to the door are aligned during the lowering of the door by fixing the connecting parts rigidly connected to the door via an elastic joint;

the locking motion consists of driving rotation at the level of each connection induced by driving each connection in translation;

the driving of rotation causes pivoting of a mobile subassembly of one of the parts of each connection between two angular positions, a locking position in which the subassembly is arranged in a housing of the other part in accordance with a locking configuration and a releasable position in which the subassembly and the housing have complementary configurations.

The invention also relates to a mechanism for arming/disarming an aircraft door evacuation slide connected to a cabin floor of the aircraft adapted to implement the above method. This mechanism includes two releasable connectors disposed on respective opposite sides of the bottom of the door and each composed of two half-connectors coaxial with an axis perpendicular to the floor, a so-called upper half-connector rigidly connected to the door and having means of attachment to the evacuation slide, and a so-called lower half-connector fixed to the cabin floor, as well as a latch for locking/unlocking the upper half-connector and the lower half-connector. Each latch includes a part mobile in rotation about the axis of the half-connectors and adapted to be housed in the corresponding lower half-connector. The mechanism also includes a controlled electric motor coupled to two links, each link being adapted to drive the mobile part of each latch in rotation between two angular positions:

a locking angular position in which said part is locked in a locking configuration of the walls of the corresponding lower half-connector, and a releasable angular position in which said part and said base have walls of complementary configuration.

In accordance with preferred embodiments:

each lower half-connector is a threshold fitting that includes a base adapted to be fixed to the floor;

each lower half-connector has a so-called upper end of globally conical shape having walls forming shoulders that extend radially to form the base and, between the upper end and the base, a cylindrical intermediate portion radially smaller than the shoulders and adapted to form with the upper end a housing for the mobile part of the corresponding latch;

each upper half-connector includes a pillar adapted to be mounted perpendicularly to the floor in an arm for fixing it to the door and a control ring mobile in rotation mounted on the pillar and connected to a driving link, each locking/unlocking latch, also mounted on the pillar, consists of a casing and the so-called mobile internal part adapted to be driven by the link via the control ring;

the mobile internal part and the control ring are coupled via connections by lugs and notches;

the pillar is mounted in the arm via an elastic joint adapted to absorb misalignments between the two half-connectors, notably in the event of relative movements in flight between the door and the fuselage or during their connection during the lowering of the door into the closed position;

position sensors are mounted on the mobile control ring in order to determine the angular position of said ring and to deduce therefrom the position of the latches and the armed/disarmed status of the evacuation slide;

the casing of the latch includes pins for attaching the evacuation slide;

the casing of the latch includes a cylindrical internal wall forming a face for centering and indexing the threshold fitting;

each mobile internal part is provided with a target for the position sensors of the latch;

the target of the mobile internal parts forms a pull-tab that can be maneuvered to arm or disarm the evacuation slide in the event of the electric motor stopping;

the motor is a bistable electrical actuator of solenoid type;

an indicator lamp informing the operator of the armed/disarmed status of the door and a door computer manage the arming/disarming operations, in particular the arming/disarming angular positions of the upper half-connectors.

The invention also relates to an aircraft door equipped with two upper half-connectors, latches and an energy source coupled to the links for driving the mobile parts of each upper half-connector in rotation according to locking and releasable angular positions of the arming/disarming mechanism defined above. The upper half-connectors are adapted to be associated with the threshold fittings of said mechanism.

BRIEF DESCRIPTION OF THE FIGURES

Other data, features and advantages of the present invention will become apparent on reading the following non-limiting description with reference to the appended figures which show.

DETAILED DESCRIPTION OF THE INVENTION

Throughout the text, the terms "upper" and "lower", "vertical" and "horizontal" and their derivatives relate to locations of elements or parts of elements positioned relative to the level of the (land or water) landing or takeoff surface in the broad sense considered as a horizontal reference plane.

Figure 1:
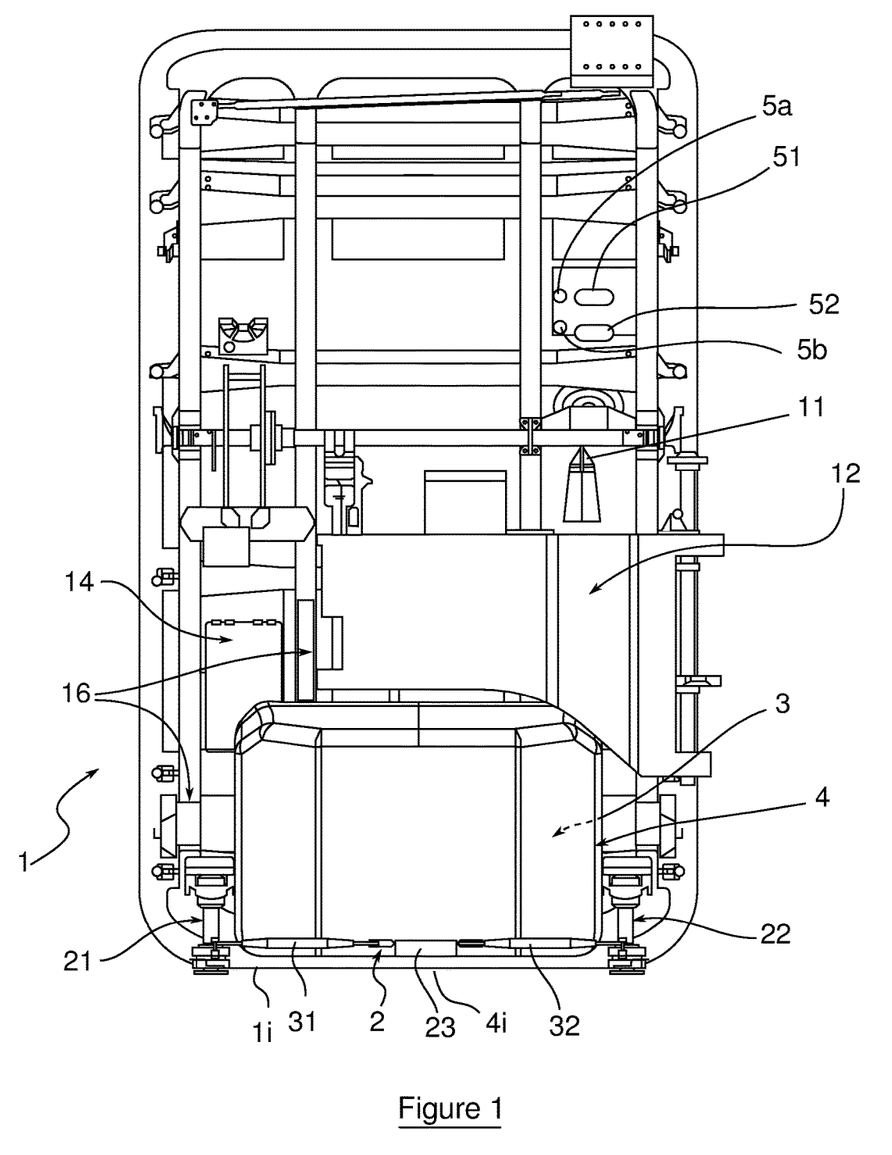
FIG. 1, a partially cutaway front view of an aircraft door seen from inside the aircraft, equipped with one example of an arming/disarming mechanism in accordance with the invention.

Referring to FIG. 1, a partially cutaway front view of an aircraft door 1 as seen from inside the aircraft is shown. This door 1 is the usual passenger front entry/exit door. It is notably equipped with a raising/lowering handle 11, an arm 12 for opening the door 1 in order to enable passengers to enter or exit and an arming/disarming mechanism 2 in accordance with the invention.

This arming/disarming mechanism 2 enables use of an evacuation slide 3 stored in the box 4 formed at the bottom of the door 1 in the event of emergencies that necessitate evacuation of the occupants of the aircraft. This mechanism 2 is triggered by pressing a DISARM control button 51 or an ARM control button 52. Light-emitting diodes 5a and 5b are disposed facing the buttons 51 and 52 to indicate the armed or disarmed status, respectively, of the mechanism. Alternatively, back-lit or equivalent buttons may replace the diodes.

The lower face 4i of the box 4 is situated at substantially the same level as the lower face 1i of the structure of the door. The mechanism 2 includes two releasable connectors 21 and 22 disposed on respective opposite sides of the bottom of the door. Each connector 21, 22 comprises two half-connectors, a so-called upper half-connector 21s, 22s fixed to a reinforcing structure 16 of the door 1 and a so-called lower half-connector 21i, 22i. Each lower half-connector 21i, 22i is formed by a so-called threshold fitting fixed to the cabin floor 6. In FIG. 1, the door 1 has been lowered into the closed position and the half-connectors 21s and 22s are engaged on the threshold fittings 21i and 22i. In the figures in which a single connector 21 or half-connector 21i, 21s is shown, the description is valid for the other connector 22 or half-connector 22i, 22s.

The mechanism 2 also includes a bistable electric motor 23 of solenoid type controlled by a door computer 14 and actuated by the control buttons 51 and 52. The motor 23 is coupled to two links 31 and 32, each link driving a respective upper half-connector 21s, 22s in rotation between a so-called arming locking position (ARM) and a so-called disarming releasable position (DISARM), which positions are described in detail hereinafter.

Figure 2:
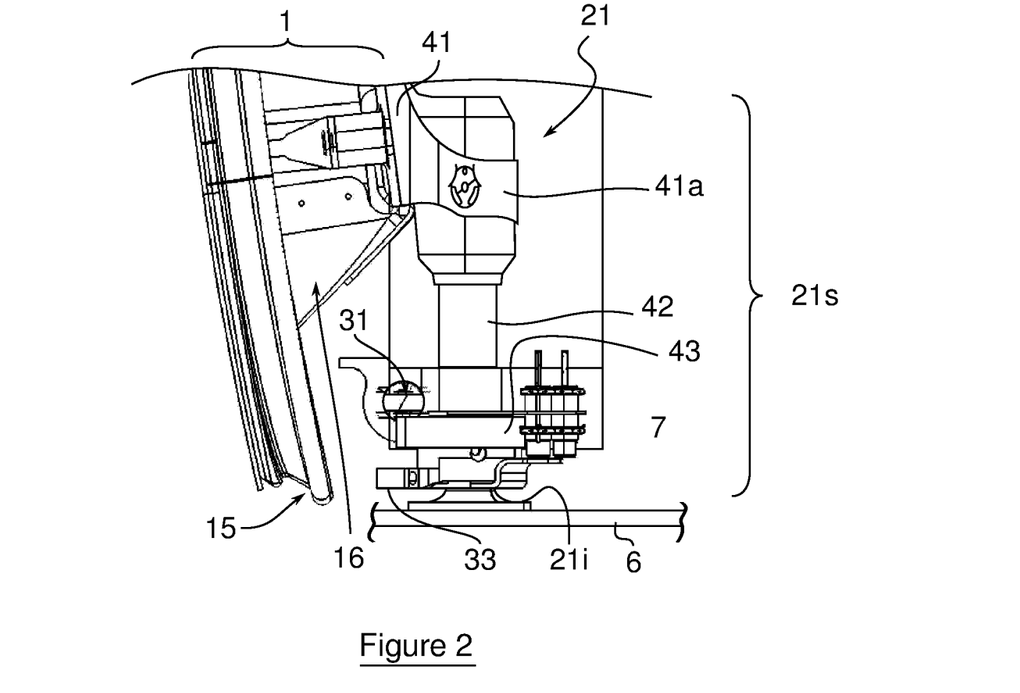
FIG. 2, a lateral view of the door and one of the releasable connectors of the mechanism from FIG. 1.
Figure 3:
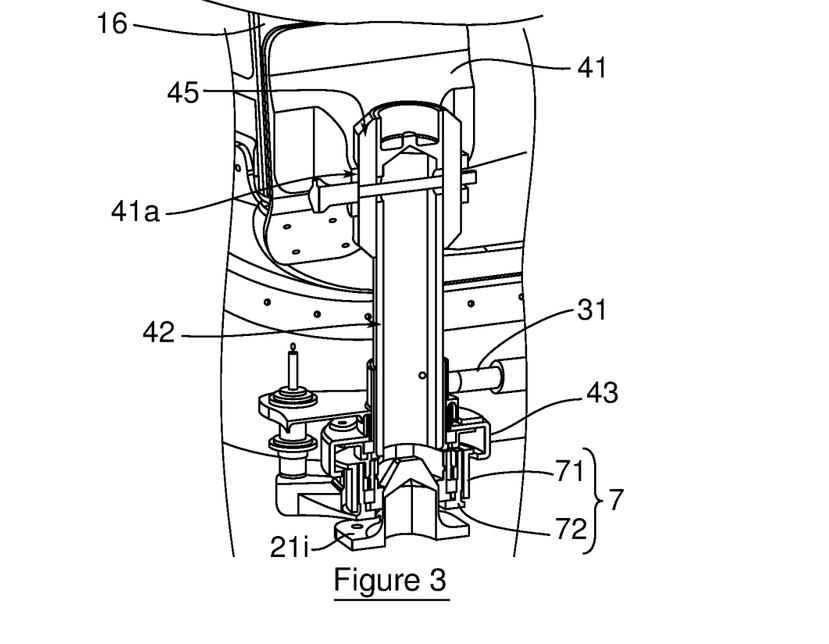
FIG. 3, a sectional view of the connector according to FIG. 2.

FIG. 2 shows a side view of the door 1 and the releasable connector 21, FIG. 3 providing a sectional view of the connector 21. The door 1 consists of a panel 15 and a reinforcing structure 16 in which is notably housed the equipment that controls, actuates and manages the door 1.

The upper half-connector 21s includes attachment pins 33 for the evacuation slide 3 stored in the box 4 and an arm 41 fixing it to the box 4. This female half-connector 21s is coupled to a male threshold fitting 21i fixed to the cabin floor 6 to form the releasable connector 21 as explained hereinafter.

The upper half-connector 21s includes a pillar 42 mounted vertically and perpendicularly to the floor 6 by the fixing arm 41, a control ring 43 mobile in rotation mounted on the pillar 42 and connected to the driving link 31, and a locking/unlocking latch 7 also mounted on the pillar 42.

In the FIG. 3 sectional view, there are more specifically distinguished the elastic material—for example silicone—joint 45 by means of which the pillar 42 is mounted in the annular support 41a of the fixing arm 41. This elastic joint 45 is intended to absorb misalignments between the half-connectors, for example during their connection during lowering of the door into the closed position or during relative movements between the door and the fuselage in flight.

In this FIG. 3 sectional view there also appears a mobile part 72 internal to the latch 7 which is coupled to the mobile control ring 43 to be driven in rotation as described below.

Figure 4A:
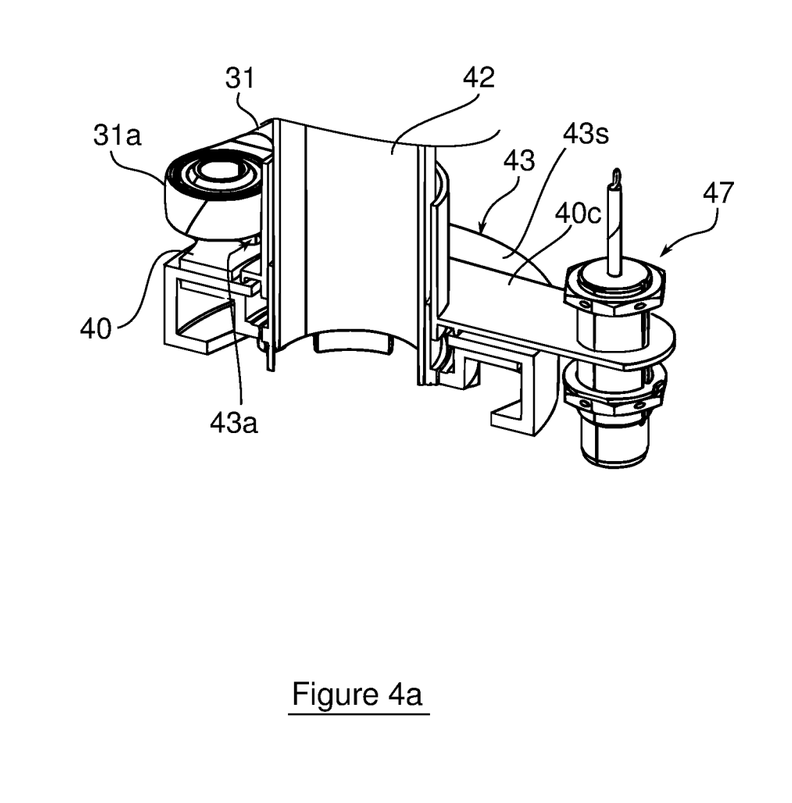
FIGS. 4*a* and 4*b*, a sectional view and a partially exploded view of the upper half-connector of the example of a connector in accordance with the invention connected to a driving link and position sensors.
Figure 4B:
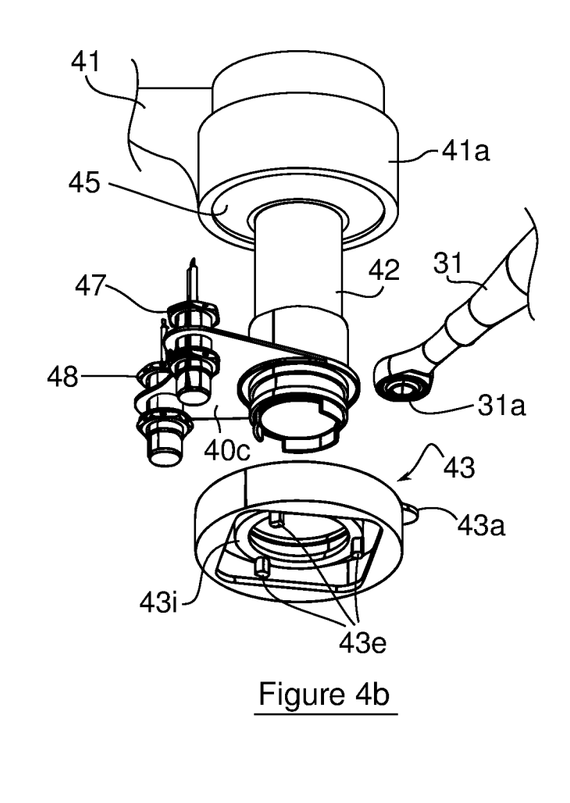

Referring to the sectional and partly exploded views of the upper half-connector 21 in FIGS. 4a and 4b, position sensors 47 and 48 are advantageously mounted on the pillar 42 of the upper half-connector 21s via a support 40c. These sensors 47 and 48 associated with a target 72c on the latch 7 (see FIG. 5c) make it possible to track the movement of the latch, to ensure it functions correctly, to determine the angular position of the ring 43 (cf. FIGS. 7a and 7b), and to deduce therefrom the armed/disarmed status of the evacuation slide.

Moreover, these views show the coupling of the driving link 31 to the mobile ring 43 by an annular end fitting 31a formed at the end of the link 31 connected with a lug 43a on a base 40 fixed to the upper face 43s of the ring 43. FIG. 4b also shows three lugs 43e on a lower face 43i of the control ring 43, these lugs being intended to be coupled to the mobile internal part 72 of a latch 7.

Figures 5A, 5B, 5C:
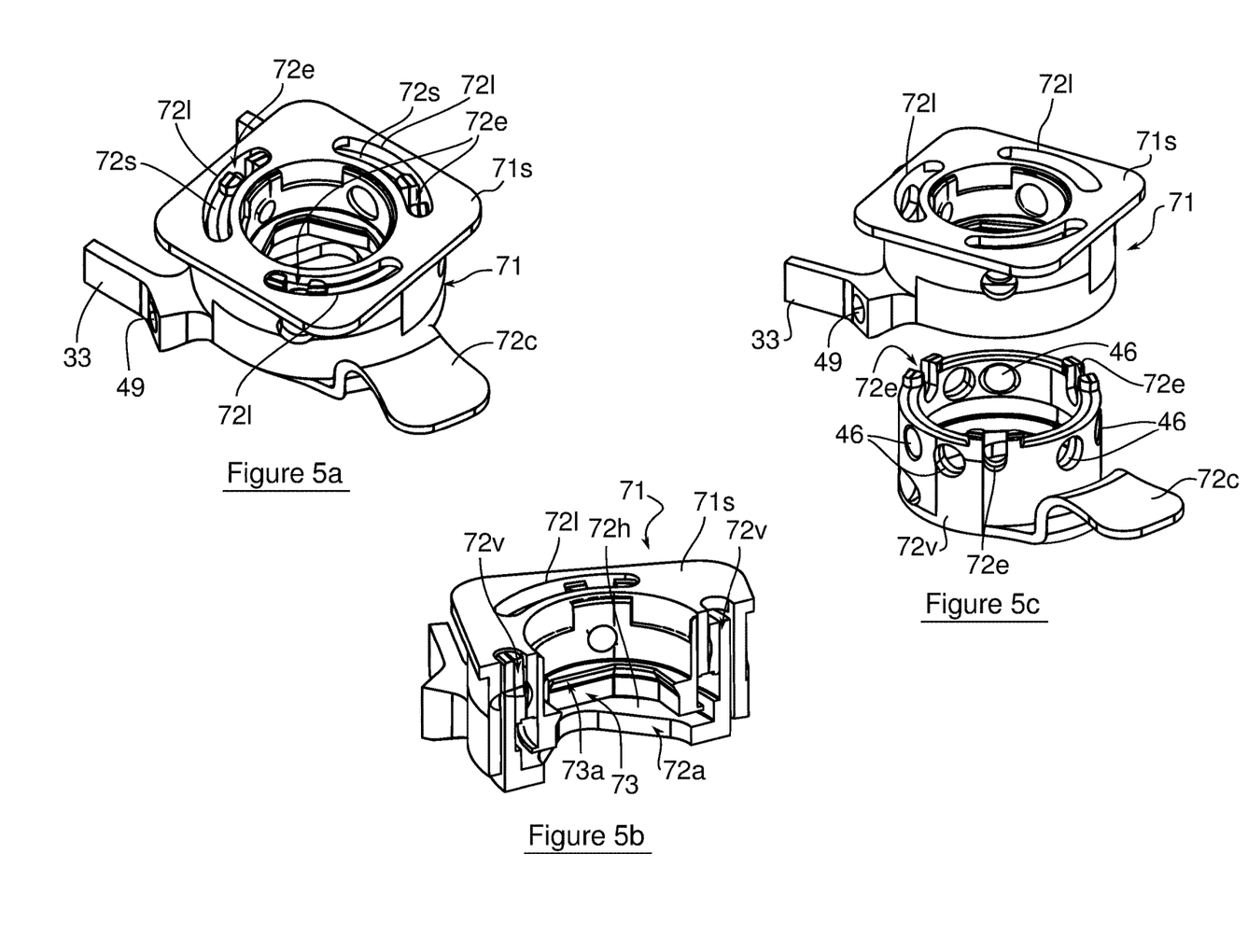
FIGS. 5*a* to 5*c*, perspective, sectional and exploded views of an example of a half-connector latch in accordance with the invention.

The latch 7 is described in detail now with reference to the perspective, sectional and exploded views of FIGS. 5a to 5c, respectively. The latch 7 comprises an external casing 71 and the mobile internal part 72. The external casing 71 has pins 33 for attaching the evacuation slide and advantageously an internal wall 73 including a cylindrical central bore 73a for centering the threshold fitting 21i (cf. FIGS. 6a to 6c).

Moreover, a system for indexing the position of the mobile part 72 is advantageously provided: here this known indexing system is mounted in a housing 49 formed in the example shown in the casing 71 at the root of a pin 33. The indexing system functions in conjunction with a recessed marker 46 formed in a vertical annular wall 72v of the part 72.

Once mounted, the vertical annular wall 72v is integrated into a corresponding interstice of the casing 71. This annular wall 72v has on its upper face 72s three depressed notches 72e, each of these notches being able to accept a lug 43e formed on the lower face 43i of the control ring 43 (cf. FIG. 4b). Each lug can then move along a circular opening 721 on the upper face 71s of the casing 71.

The lower part of the annular wall 72v of the mobile part 72 is extended by a horizontal wall 72h. This horizontal wall 72h includes a central bore 72a with a configuration adapted to the configuration of the threshold fitting in order to define locking and releasable positions as described in detail hereinafter.

Moreover, the mobile part 72 includes a target 72c for the position sensors 47, 48 of the latch (cf. FIGS. 4a and 4b). The target 72c forms a pull-tab that can be maneuvered by hand to arm or disarm the door in the event of failure of the electric motor.

Figure 6A:
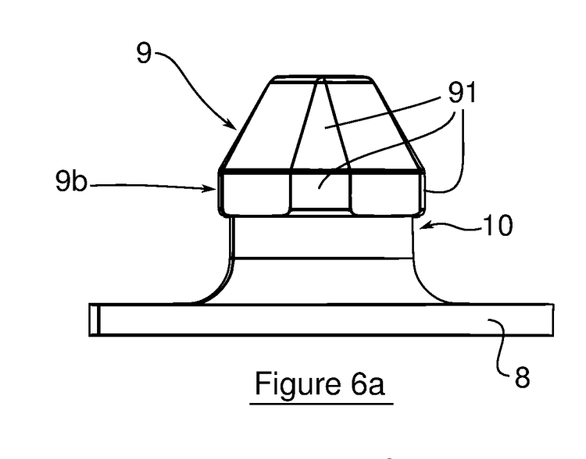
FIGS. 6*a* to 6*c*, two lateral views and a top view of an example of a threshold fitting in accordance with the invention.
Figure 6B:
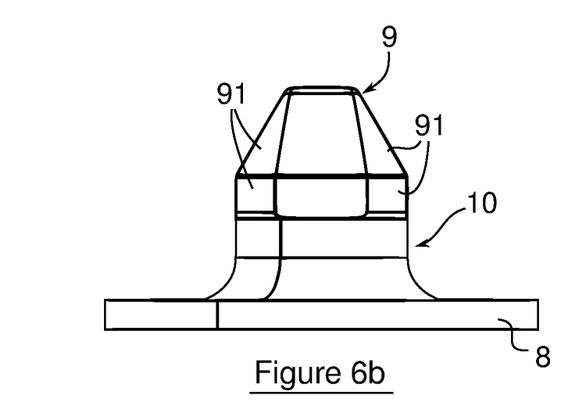
Figure 6C:
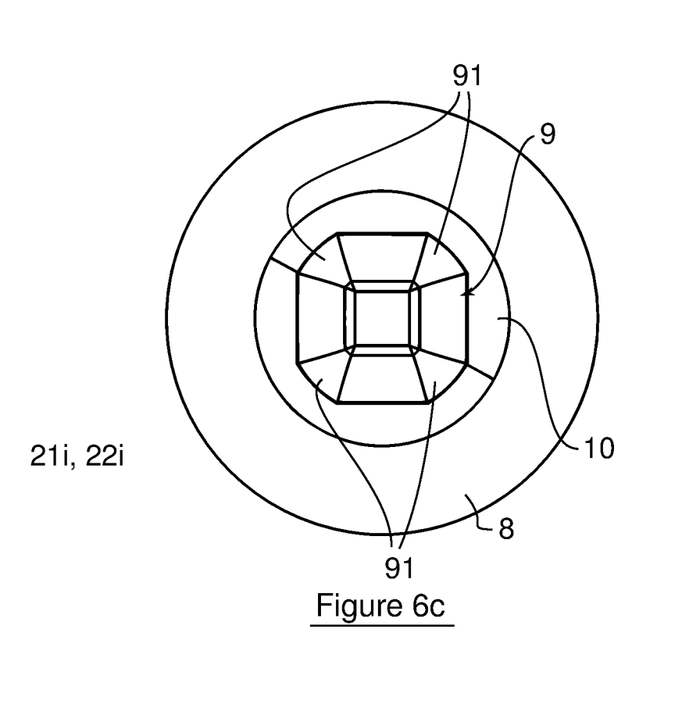

The lateral views and the top view of FIGS. 6a to 6c show a threshold fitting 21i of the connector 21 (cf. FIGS. 2 and 3) adapted to be connected to the upper half-connector 21s described above. This threshold fitting 21i includes a base 8 intended to be fixed to the cabin floor 6 (cf. FIG. 1), the base 8 resting on this floor 6 so that no cavity is formed between the base 8 and the threshold.

The threshold fitting 21i has a so-called upper end 9 of globally conical shape including four shoulders 91 that extend radially and above a cylindrical base 9b. A cylindrical intermediate portion 10 radially smaller than the shoulders 91 extends axially between this cylindrical base 9b and the base 8. This smaller intermediate portion 10 houses the horizontal wall 72h of the bore 72a in the mobile part 72 (cf. FIG. 5b): the configuration of this wall 72h is complementary to that of the cylindrical base 9b so that:

in certain angular positions of the part 72, the wall 72h of this part is in corresponding relationship with that of the base 9b—releasable positions for the part 72 and therefore for the latch 7—and, once the part 72 is at the level of the intermediate portion 10, +/−45° rotations of the mobile part 72 from the preceding positions lock this part between the shoulders 91 of the base 9b and the base 8 of the threshold fitting 21 i: the latch 7 is then locked to the threshold fitting (locking positions).

Figures 7A, 7B:
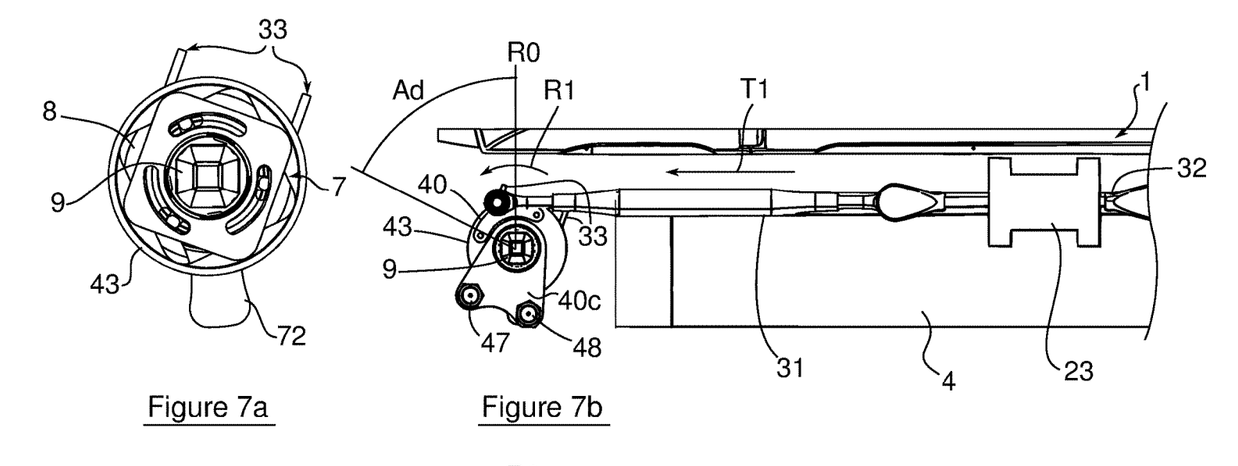
FIGS. 7*a* and 7*b*, a part-sectional top view of one of the connectors and a view of the arming/disarming mechanism in accordance with the invention in the disarming or DISARM position, and FIGS. 8*a* and 8*b*, part-sectional top views of the connector and the arming/disarming mechanism in accordance with FIGS. 7*a* and 7*b* in the arming or ARM position.

The top views of FIGS. 7a and 7b show the connector 2 partly in section and the arming/disarming mechanism 2 in the disarming position DISARM. To reach this position, the motor 23 is actuated by the control button 51 and the door computer 14 (FIG. 1) so that the movement in translation T1 of the driving links 31 and 32 causes pivoting in rotation R1 of the control ring 43 by a disarming angle Ad (relative to a reference R₀) for which the latches 7 are not in a locking position on the threshold fitting 21i. In this position, the latches 7 and therefore the connections 21, 22 are released: the door can be raised to decouple the connections and then opened with the arm 12 (FIG. 1) in the normal way.

In order to place the mechanism 2 in the arming mode ARM, a reverse motion—reverse movement in translation of the links 31, 32 driving reverse rotation of the control ring 43—is triggered by the control button 51 of the motor 23 and the door computer 14 (FIG. 1).

Figure 8A:
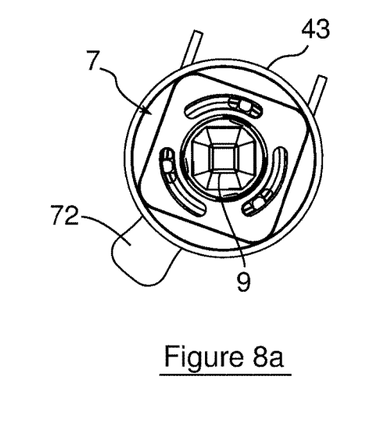
Figure 8B:
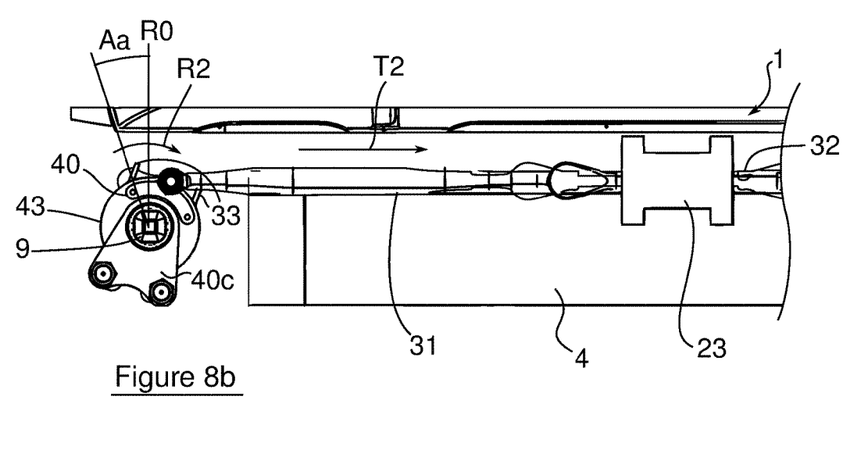

Refer to FIGS. 8a and 8b, which repeat the top views of FIGS. 7a and 7b in the ARM position. In this position, the door 1 is in the closed position and the latches 7 are locked in a locking angular position on the threshold fittings 21 i by rotation of the control ring 43 by an arming angle i. To this end, the links 31, 32 are actuated in accordance with a locking motion triggered via the electric motor 23 by the control button 52 and the door computer 14 (FIG. 1).

By virtue of this motion, the movement in translation T2 of the driving links 31 and 32 causes pivoting in rotation R2 of the control ring 43 by the angle Aa: the connectors 21 and 22 are locked and raising and then opening the door causes unfurling and inflation of the evacuation slide 3 (FIG. 1).

The driving in rotation causes pivoting of a mobile subassembly of one of the parts of each connection between two extreme positions, a locking position in which the subassembly is arranged in a housing of the other part in accordance with a locking configuration and a releasable position in which the subassembly and the housing have complementary configurations.

The invention is not limited to the embodiments described and shown.

The invention claimed is:

1. A method for arming mode and disarming mode of an evacuation slide (3) of an aircraft door (1) connected to a cabin floor (6) of the aircraft, the method comprising:
   activating the arming mode (ARM) for lowering the aircraft door (1) into a closed position to engage half connectors (21s, 21i; 22s, 22i) forming at least two releasable connections (21, 22) coaxial with an axis perpendicular to the cabin floor (6);
   rigidly connecting the half connectors (21s, 21i; 22s, 22i) of each connection (21, 22) to the door (1) and to the cabin floor (6), respectively;
   locking the connections (21, 22) by driving, using a locking motion (T1, R1) triggered by a control (51) of an energy source (23);
   wherein said locking step includes driving in rotation (R2) about the axis of each connection (21, 22) induced by driving in translation (T2) by coupling with the energy source (23) until a configuration is reached locking the connections (21, 22);
   wherein in the event of an emergency evacuation, unfurling and inflating the evacuation slide (3) attached only to each connection (21, 22), and the disarming mode (DISARM) unlocking said connections by a mechanically driven reverse motion (T2, R2) and then raising the door (1) to decouple the connections (21, 22) before opening the door.

2. The method as claimed in claim 1, wherein the connecting parts (21i, 22i) are rigidly connected to the cabin floor (6) form extensions emerging from the floor (6).

3. The method as claimed in claim 1, wherein the connecting parts (21s, 21i; 22s, 22i) are aligned during the lowering of the door (1) by fixing the connecting parts (21s, 22s) rigidly connected to the door (1) via an elastic joint (45).

4. The method as claimed in claim 1, wherein the driving in rotation (R1, R2) causes pivoting of a mobile subassembly (72) of one of the parts (21s, 22s) of each connection (21, 22) between two angular positions (Ad, Aa), a locking position in which the subassembly (72) is arranged in a housing (10) of the other part (21i, 22i) in accordance with a locking configuration and a releasable position in which the subassembly (72) and the housing (10) have complementary configurations.

5. A mechanism for at least one of arming and disarming an evacuation slide (3) of an aircraft door (1) connected to a cabin floor (6) of the aircraft comprising:
   two releasable connectors (21, 22) disposed on respective opposite sides of a bottom (1i) of the aircraft door (1) and each releasable connector including an upper half-connectors (21s, 22s) and a lower half connector (21i, 22), the upper half connector and the lower half connector are coaxial with an axis perpendicular to the cabin floor, the upper half-connector (21s, 22s) is rigidly connected to the door (1) and includes an attachment device (33) to attach to the evacuation slide (3), the lower half-connector (21i, 22i) is fixed to the cabin floor (6) and to a latch (7) for locking and unlocking the upper half-connector (21s, 22s) and the lower half-connector (21i, 22i), each latch (7) includes a part mobile (72) in rotation about the axis of the half-connectors (21s, 22s; 21i, 22i) and is adapted house in the corresponding lower half-connector (21i, 22i), and
   wherein the mechanism (2) further includes:
   an energy source (23) coupled to two links (31, 32), each link (31, 32) adapted to move in translation parallel to the floor by the energy source (23) to drive the mobile part (72) of a latch (7) in rotation (R1, R2) between two angular positions:
   an angular position (Aa) locking the locking configuration of the walls (91) of a base (9b) of the corresponding lower half-connector (21i, 22i), and
   a releasable angular position (Ad) of complementary configuration of the walls (72a, 91) of said part (72) and said base (9b).

6. The mechanism as claimed in claim 5, wherein each lower half-connector (21i, 22i) is a threshold fitting that includes a base (8) adapted to fix to the floor (6), the base (8)

resting on the floor (6) so that no cavity is formed between the base (8) and the floor (6).

7. The mechanism as claimed in claim 5, wherein each lower half-connector (21*i*, 22*i*) has an upper end (9) of globally conical shape having walls forming shoulders (91) that extend radially to form the base (9*b*) and between the upper end (9) and the base (8), a cylindrical intermediate portion (10) radially smaller than the shoulders (91) and adapted to form with the upper end (9) a housing for the mobile part (72) of the corresponding latch (7).

8. The mechanism as claimed in claim 5, wherein each upper half-connector (21*s*, 22*s*) includes a pillar (42) adapted to mount perpendicularly to the floor (6) in an arm (41, 41*a*) for fixing the upper half-connector to the door (1) and a control ring (43) mobile in rotation mounted on the pillar (42) and connected to the links (31, 32), and each locking and unlocking latch (7) are mounted on the pillar (42) and includes a casing (71) and the links (31, 32) drive the mobile part (72) by the control ring (43).

9. The mechanism as claimed in claim 8, wherein the mobile internal part (72) and the control ring (43) are coupled via connections by lugs (43*e*) and notches (72*e*).

10. The mechanism as claimed in claim 8, wherein the pillar (42) is mounted in the arm (41, 41*a*) via an elastic joint (45) adapted to absorb misalignments between the two half-connectors (21*s*, 21*i*; 22*s*, 22*i*).

11. The mechanism as claimed in claim 8, wherein position sensors (47, 48) are mounted on the mobile control ring (43) to determine the angular position (Aa, Ad) of said ring (43) and to deduce from the position of the latches (7) and the armed and disarmed status of the evacuation slide (3).

12. The mechanism as claimed in claim 8, wherein the casing (71) of the latch (7) includes pins (33) for attaching the evacuation slide (3).

13. The mechanism as claimed in claim 8, wherein the casing (71) of the latch (7) includes a cylindrical internal wall (73) forming a face (73*a*) for centering the threshold fitting (21*i*, 22*i*).

14. The mechanism as claimed in claim 11, wherein each mobile internal part (72) is provided with a target (72*c*) for the position sensors (47, 48) of the latch (7).

15. The mechanism as claimed in claim 14, wherein the target (72*c*) of the mobile internal parts (72) forms a pull-tab that is maneuvered to arm and disarm the evacuation slide (3) in the event of failure of an electric motor (23) used as an energy source.

16. The mechanism as claimed in claim 15, wherein the motor (23) is a bistable electrical actuator of solenoid type.

17. The mechanism as claimed in claim 5, wherein an indicator lamp (5*a*, 5*b*) informing the operator of the armed and the disarmed status of the aircraft door and a door computer (14) manage the arming and disarming angular positions (Aa, Ad) of the upper half-connectors (21*s*, 22*s*).

18. The aircraft comprising a door (1) equipped with two upper half-connectors (21*s*, 22*s*), latches (7), and an energy source coupled to the links for driving the mobile parts of each upper half-connector (21*s*, 22*s*) in rotation according to angular locking and releasable positions of the mechanism (2) as claimed in claim 5, wherein the upper half-connectors (21*s*, 22*s*) are adapted to associate with the threshold fittings (21*i*, 22*i*) of said mechanism (2).

\* \* \* \* \*